US007925757B1

(12) United States Patent
Rolia et al.

(10) Patent No.: US 7,925,757 B1
(45) Date of Patent: Apr. 12, 2011

(54) DETERMINING A PORTION OF REQUIRED CAPACITY ATTRIBUTED TO APPLICATIONS IN MULTIPLE CLASSES OF SERVICE

(75) Inventors: Jerry Rolia, Ontario (CA); Martin Arlitt, Alberta (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1295 days.

(21) Appl. No.: 11/492,739

(22) Filed: Jul. 25, 2006

(51) Int. Cl.
*G06F 15/16* (2006.01)
*G06F 12/00* (2006.01)

(52) U.S. Cl. .................................... 709/226; 718/105

(58) Field of Classification Search .......... 709/226–229, 709/203, 250; 718/105
See application file for complete search history.

(56) References Cited

U.S. PATENT DOCUMENTS

| 7,177,275 B2 * | 2/2007 | Stanwood et al. ............ 370/230 |
| 2006/0117317 A1 * | 6/2006 | Crawford et al. ............ 718/104 |
| 2006/0271700 A1 * | 11/2006 | Kawai et al. .................. 709/233 |

OTHER PUBLICATIONS

Rolia, J. et al., An Automated Approach for Supporting Application QoS in Shared Resource Pools, Proceedings of the 1st International Workshop on Self-Managed Systems and Services (Selfman 2005), May 2005, 5 pages.*
Rolia et al., A Capacity Management Service for Resource Pools, WOSP'05, Jul. 12-14, 2005, pp. 229-237.*
Andrzejak, A. et al., "Bounding the Resource Savings of Utility Computing Models", HP Labs Technical Report, HPL-2002-339, Internal Accession Date Dec. 2002.
Appleby, K. et al., "Oceano-SLA Based Management of a Computing Utitlity", downloaded Jun. 6, 2005.
Chase, J. S. et al., "Managing Energy and Server Resources in Hosting Centers", downloaded Jun. 6, 2005.
Pieper, J. et al., "High Level Cache Simulation for Heterogeneous Multiprocessors", DAC '04, ACM Press, Jun. 2004.
Hrischuk, C. E. et al., "Trace-Based Load Characterization for Generating Performance Software Models", IEEE Transactions on Software Engineering, Jan. 1999, Abstract only.
Rolia, J. et al., "Automating Enterprise Application Placement in Resource Utilities", 2003.
Singhal, S. et al., "Quartermaster—A Resource Utility System", HP Labs Technical Report, HPL-2004-152, Internal Accession Date Sep. 2004.
http://www.aogtech.com/, Asset Optimization Group, downloaded Jun. 6, 2005.
http://www.hp.com/go/PRM, HP Process Resource Manager, downloaded Jun. 6, 2005.
http://www.teamquest.com, TeamQuest, downloaded Jun. 6, 2005.

* cited by examiner

*Primary Examiner* — Zarni Maung

(57) ABSTRACT

A required capacity for applications is determined. The applications are run on a shared pool of resources and each application belongs to at least one class of service of multiple classes of service. A portion of the required capacity attributed to each class of service is determined based on traces for the applications running on the shared pool of resources. A portion of the required capacity attributed to each application in each class of service is determined from the portion of the required capacity attributed to each class of service.

20 Claims, 8 Drawing Sheets

DETERMINING A PORTION OF REQUIRED CAPACITY ATTRIBUTED TO APPLICATIONS IN MULTIPLE CLASSES OF SERVICE

BACKGROUND

Grid computing services, utility-based data centers, and other types of resource-on-demand systems are becomingly increasingly popular as a highly scalable means for utilizing computer resources to meet the computing demands of users. In many of these systems, computer resources are allocated to a user's computing needs on demand. For example, in a data center, the computer resources, such as servers, CPU's, memory and storage are allocated among many different applications for many different users. In many situations it may be beneficial to accurately determine the impact of a user's computing demands on the capacity of a resource-on-demand system where computer resources may be shared, such as for billing purposes or for capacity planning in a shared utility. Many applications may be running in a shared utility, such as a data center. Some of those applications may be running at close to their peak demand for the majority of their execution time. These applications generally may not be able to share resources because they run at close to their peak demand for the majority of their execution time. The impact of these applications may be determined to be the resources required for running these applications at peak demand. Other applications, however, may be running at close to peak demand for short periods of time. These applications may be able to share resources with other applications. For example, a system administrator may allocate 50 servers to an application to accommodate the peak demand of the application. However, the peak demand may only occur for short periods of time. Thus, some of the 50 servers may be shared with other applications during non-peak demand times for the application or some of the servers are unused. The impact for these types of applications on the data center resources is difficult to determine because of the potential for sharing servers.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the embodiments are described. However, one of ordinary skill in the art would readily recognize that the same principles are equally applicable to, and can be implemented using variations of the described embodiments.

Figure 1:
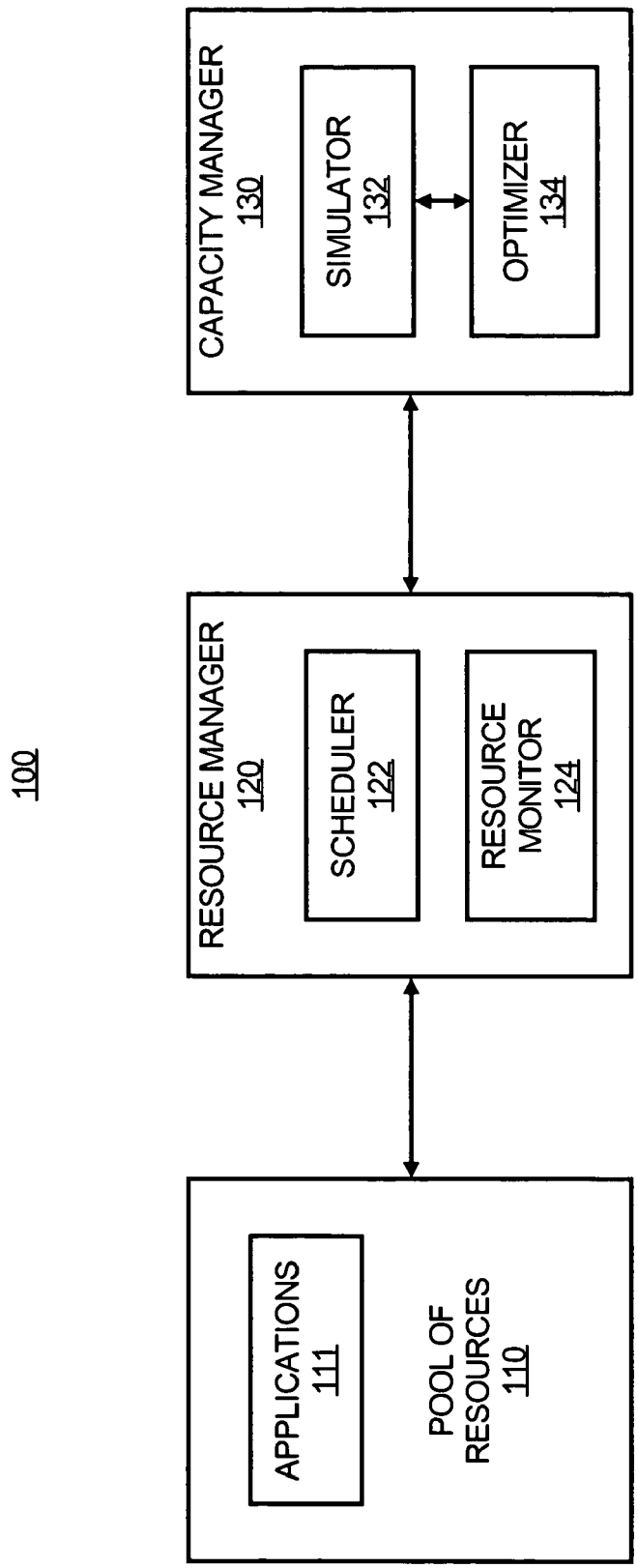
FIG. 1 illustrates a system for allocating resources, according to an embodiment.

FIG. 1 illustrates a system 100 according to an embodiment that provides computer resources on demand and is operable to adjust allocated computer resources as needed. The system 100 includes a pool of resources 110, a resource manager 120 and a capacity manager 130. The pool of resources 110 run one or more workloads, which may include the applications 111. A workload may include multiple applications of the applications 111. The pool of resources 110 may include processors, input/output ("I/O") bandwidth, memory, hard drives and other types of known resources in a data center. Another example of resources may include servers or clusters of servers or racks of bladed servers that are to be shared by applications.

The resource manager 120 includes a scheduler 122 and a resource monitor 124. Each resource of the pool of resources 110 may include a resource manager 120. In other embodiments, if multiple pools of resources are used, each pool of resources may use a single resource manager or multiple pools of resources may use a single resource manager. The scheduler 122 schedules workloads to run on resources based on resource allocation assignments determined by the capacity manger 130. The scheduler 122 may divide a resource across a workload cluster, wherein a workload cluster includes a plurality of applications. In other words, the resource may be allocated to multiple workloads in a workload cluster at any given time.

The resource monitor 124 monitors predetermined metrics of the resources in the pool of resources 110. For example, the resources may be represented using one or more capacity attributes, such as CPU, memory, I/O operation rates, and bandwidths. Other capacity attributes may be used and measured as is known in the art. The resource monitor 124 measures values for the capacity attributes. For example, workload A is measured to use 80% of the CPU time for a processor resource. The measured capacity attributes are referred to as traces 125, shown in FIG. 2, and may be gathered continuously over time for the resources utilized to run the applications 111. The traces 125 may be gathered on a per-server basis or a per-application workload basis. In one embodiment, if the traces 125 are gathered on a per-server basis, the aggregate load on the server may be treated as a single workload for analysis.

The traces 125 may include the observed utilization of resources, referred to as demand traces, which may include the measured capacity attributes. In another embodiment, the traces 125 include allocation traces. For example, the scheduler 122 dynamically allocates resources to workloads as demand increases or decreases. The demand is the resources needed to execute a workload or workload cluster. The allocation traces capture the allocation of resources to workloads. The allocation traces may vary relative to demand traces because allocated resources are not always fully utilized, and the utilization of the resources is measured to determine the demand traces. In some situations, there may not be enough resources allocated to satisfy a demand and thus the demand is not immediately satisfied. Instead, the demand is carried forward and is satisfied in a future time slot. A time slot is a predetermined period of time during which attributes for the pool of resources 110 may be measured. For example, each day of the week may be divided into 288 5 minute time slots, such that slot 0 is the first 5 minute time slot of each day. Many measurements for more than one attribute or metric may be performed during each time slot. A value for a time slot may include the mean of the measurements taken during a time slot for a particular attribute. An aggregate or another function may be used to determine the value for a time slot.

Demand carried forward and satisfied in a future time slot may be captured in both allocation and demand traces. Furthermore, a log may be kept of demand carried forward or the demand carried forward may not be tracked. Either or both allocation and demand traces may be captured and stored by the resource manager 120. The traces 125 may be used to predict future demands or may be used for simulating workload assignments performed by the capacity manager 130. The traces 125 may be used to determine the impact of allocating resources on a resource on demand system, which is further described with respect FIG. 2.

According to an embodiment, the capacity manager 130 determines a plan for assigning workloads to resources. The capacity manager 130 provides the resource manager 120 with instructions for assigning workloads to resources from the pool of resources 110 based on the plan. In one embodiment, the capacity manager 130 includes a simulator 132 and an optimizer 134 for simulating different resource assignments to workloads and for selecting a resource assignment that best satisfies predetermined objectives and constraints. The capacity manager 130 is further described in U.S. patent application Ser. No. 11/147,096, entitled "Determining Required Capacity of a Resource", by Jerry Rolia et al., which is incorporated by reference in its entirety.

Applications in workloads may be assigned to one or more Classes of Service (CoSs), and resources may be allocated to workloads based on constraints for these CoSs. One type of constraint is a resource access CoS constraint, which refers to constraints on workloads assigned to a particular CoS. Different classes may have different resource access CoS constraints. Applications may be assigned to one or more CoSs based on the constraints for running the applications, which may be provided in a Service Level Agreement (SLA) or specified in another manner, for example, by the entity requesting the resource on demand system to run the application.

One example, of a resource access CoS constraint may include a resource access probability θ and a deadline s. The resource access probability θ refers to the probability that a workload receives a unit of capacity when requested. The required capacity of a workload includes a capacity needed to run a workload. In one embodiment, the required capacity is the minimum capacity needed to run the workload or workload cluster and satisfy all resources access CoS constraints. For example, the required capacity of a workload is the capacity that is needed for running the workload such that the resource access probability θ and the deadline s specified for the CoS for the workload are met.

As an example of different CoSs, interactive applications may be included in one CoS and batch applications may be included in another CoS. The CoS for the interactive applications may have a higher resource access probability θ than the CoS for the batch applications, because batch application processing typically can be deferred without violating an SLA.

The resource access probability θ may be defined as follows. Let A be the number of workload traces 125 under consideration. Each trace has W weeks of observations with T observations per day as measured every m minutes. The notion of a week may be used as a timescale for SLAs, however, other timescales may be used. Time of day captures the diurnal nature of interactive enterprise workloads, such as those used directly by end users. Other time scales and patterns may also be used. Each of the t times of day, e.g., 8:00 am to 8:05 am, is referred to as a slot. For 5 minute measurement intervals, there are 288 slots per day. Each slot t may be denoted using an index $1 \leq t \leq T$. Each day x of the seven days of the week has an observation for each slot t. Each observation has a measured value for each of the capacity attributes considered in the analysis.

To define resource access CoS more formally, one CoS and one capacity attribute that has a capacity limit of L units of demand may be considered. Let $D_{w,x,t}$ be the sum of the demands upon the attribute by the A workloads for week w, day x and slot t. The measured value of θ may be defined as shown in Equation (1) to determine the quantity of resources needed by a shared utility to support each customer application. This information may be used for sharing purposes.

$$\theta = \min_{w=1}^{W} \min_{t=1}^{T} \frac{\sum_{x=1}^{7} \min(D_{w,x,t}, L)}{\sum_{x=1}^{7} D_{w,x,t}}. \qquad \text{Equation (1)}$$

Thus, θ may be reported as the minimum resource access probability received any week for any of the slots, t, per day. Furthermore, let L' be the required capacity for a capacity attribute to support a CoS constraint. A required capacity L' may be the smallest capacity value, $L' \leq L$, to offer a probability θ' such that $\theta' \geq \theta$, and such that those demands that are not satisfied upon request, $D_{w,x,t} - L' > 0$, are satisfied within a deadline s. The deadline may be expressed as an integer number of slots s.

Those requests for units of capacity that are not received on demand may be deferred. Deferred units of capacity are carried forward and must be made available to the workload within the deadline s. If either part of the constraint is unsatisfied then there is a service level violation. The demands reflected in the traces are used to compute the empirical value for θ for the traces and/or the minimum capacity required to ensure that a constraint is satisfied. Multiple CoSs may be supported so that workloads with different needs may be accommodated.

Figure 2:
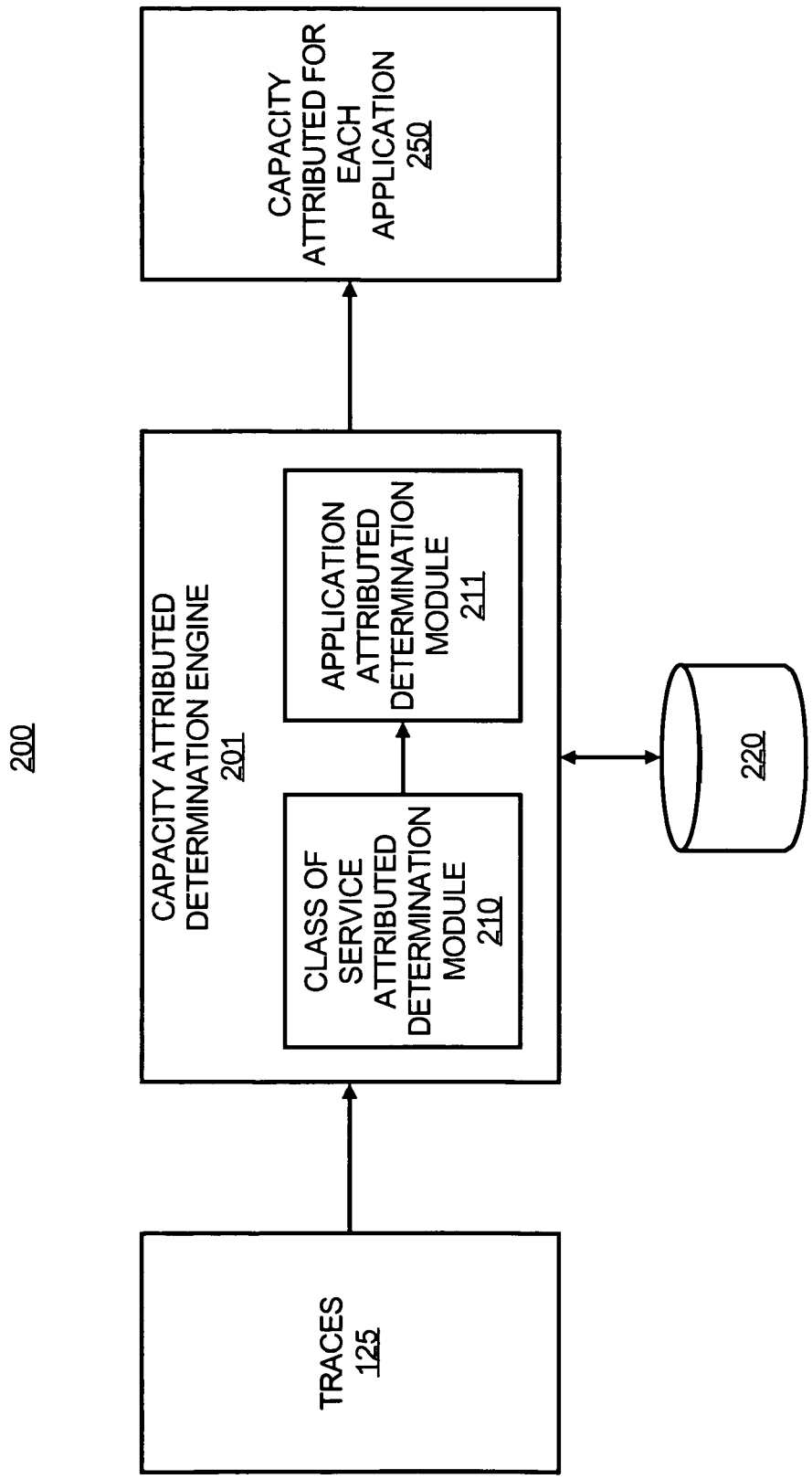
FIG. 2 illustrates a system including a capacity attributed determination engine, according to an embodiment.

FIG. 2 illustrates a system 200 including a capacity attributed determination engine 201, according to an embodiment, that is operable to determine the capacity attributed to applications in different CoSs. In certain situations it may be beneficial to determine the impact of workloads on resources in a shared utility, such as a data center or another type of resource on demand system. For example, with regard to capacity planning of a data center, the system administrator needs to determine whether servers need to be added or whether a large amount of capacity is not being used due to excessive over provisioning. With regard to charging customers, the system administrator needs to determine the resources allocated to each customer's application in order to determine how much to charge each customer for running their applications. The capacity attributed determination engine 201 is operable to determine a portion of the capacity attributed to each application. The capacity may include the resources used to run each application.

In one embodiment, the capacity attributed determination engine 201 determines a portion of the required capacity attributed to each application. A portion of unused capacity may also be attributed to each application. The unused capacity includes resources not utilized when running the applications. Many of the applications may have time-varying demands, so the data center allocates more resources than required to run the applications. The capacity attributed determination engine 201 is operable to determine a portion of the unused capacity that is attributed to each application.

FIG. 2 illustrates the traces 125 provided as input to the capacity attributed determination engine 201 for determining a capacity attributed to each application 250. The traces 125 may include one or more of demand traces and allocation traces capturing resource utilization data for previous time periods when the applications 111 shown in FIG. 1 were executed, for example, by the pool of resources 110.

According to an embodiment, the capacity attributed determination engine 201 determines the capacity attributed to each class of service and the capacity attributed to each application within each class of service. The capacity attributed determination engine 201 may include a CoS capacity attributed determination module 210 operable to determine the capacity attributed to each class of service. The capacity attributed determination engine 201 may also include an application capacity attributed determination module 211 operable to determine the capacity attributed to each application in each class of service.

The CoS capacity attributed determination module 210 may access a database 220 or some other storage to determine the CoS for each of the applications 111 having resource utilization data captured in the traces 125. An application may be associated with a CoS based on the constraints for running each application. The traces 125 may also be stored in the database 220.

In one embodiment, the CoS capacity attributed determination module 210 determines the capacity attributed to each class of service based on the required capacity of the applications 111. As described above, the required capacity of workloads, such as the applications 111, includes a capacity needed to run the workloads. In one embodiment, the required capacity is the minimum capacity needed to run the workloads and satisfy all resources access CoS constraints. For example, the required capacity of the workloads is the capacity that is needed for running the workloads such that the resource access probability θ and the deadline s specified for the CoS for the workloads are met. The required capacity may also include unused capacity that may be needed to accommodate time-varying demands and may be determined using traces. The required capacity may be determined for individual applications. However, required capacity, as used herein, generally refers to the capacity needed to run workloads including a set of applications, such as all the applications 111 or some of the applications 111 which may include applications in each CoS.

The required capacity may include a required capacity for each capacity attribute specified in resources access CoS constraints. Examples of capacity attributes may include CPU utilization, memory, I/O operation rates, and bandwidths. An iterative search method, such as a binary search, may be used to find the required capacity for each capacity attribute. Each iteration may pass over the trace data under consideration. The required capacity for the attribute is raised or lowered such that the resource access CoS constraints are satisfied, such as satisfying the resource access probability θ and the deadline specified for the CoS. A required capacity may be determined that satisfies all the workloads in different classes of service running simultaneously.

Figure 3:
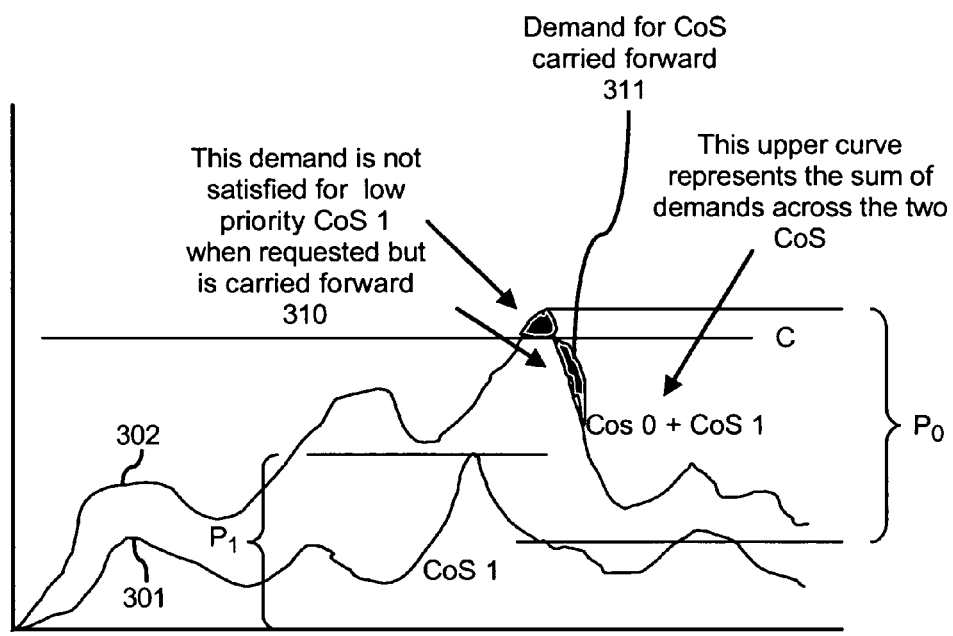
FIG. 3 illustrates a graph of traces for applications, according to an embodiment.

FIG. 3 illustrates a graph 300 showing the required capacity C for workloads having two different classes of service, $CoS_0$ and $CoS_1$, and traces for the workloads in the two classes of service, $CoS_0$ and $CoS_1$. The trace 301 is a trace for the $CoS_1$ and the trace 302 is a trace for the sum of the workloads in $CoS_0$ and $CoS_1$. The graph 300 may be for a single attribute of the pool of resources running the workloads in $CoS_0$ and $CoS_1$, however the required capacity and portion of required capacity attributed to each CoS may be determined for each attribute.

As shown in FIG. 3, at 310 some of the demand for the $CoS_1$ is not satisfied but is carried over to a future time slot, which is shown as 311. In this example, the demand for the low-priority $CoS_1$ is carried forward. Also, demand carried forward should be satisfied with a predetermined number of time slots, s, specified in the resource access CoS constraints for the $CoS_1$ so as not to violate the resource access CoS constraints.

The CoS capacity attributed determination module 210 shown in FIG. 2, for example, determines a portion of the required capacity C attributed to each class of service, $CoS_0$ and $CoS_1$ shown in FIG. 3. In one embodiment, the CoS capacity attributed determination module 210 determines a peak capacity, $P_0$ and $P_1$, that was allocated to applications in $CoS_0$ and $CoS_1$ respectively. The peak capacity for a CoS may be less than the capacity requested for the CoS if the resource access probability θ is less than one. The peak capacity may be based on the allocated capacity from the pool of resources.

In one embodiment, the CoS capacity attributed determination module 210 determines a percentage of the required capacity C attributed to each of $CoS_0$ and $CoS_1$ based on the peak capacities $P_0$ and $P_1$. For example, the percentages of the required capacity C attributed to each of $CoS_0$ and $CoS_1$ are referred to as $PP_0$ and $PP_1$.

$$PP_0 = P_0/(P_0+P_1) \qquad \text{Equation (2)}$$

$$PP_1 = P_0+P_1) \qquad \text{Equation (3)}$$

The portions of the required capacity attributed to $CoS_0$ and $CoS_1$ are referred to as $C_0$ and $C_1$, whereby $C=C_0+C_1$ in the example shown in FIG. 3.

$$C_0 = PP_0 * C \qquad \text{Equation (4)}$$

$$C_1 = PP_1 * C \qquad \text{Equation (5)}$$

An advantage of this embodiment for determining a portion of the required capacity attributed to each CoS is that each CoS may not be attributed a portion of the required capacity greater than its peak capacity. Also, this embodiment may consider full traces for determining portion of the required capacity attributed to each CoS or may consider snapshots of traces where the aggregate demand of all the classes of service are near the required capacity. Snapshots may include subsets of traces.

In other embodiments for determining the portions of required capacity attributed to each CoS, the CoS capacity attributed determination module 210 determines an average demand for each class of service or determines an area under a demand curve for each CoS. Then, the portions of the required capacity may be determined based on a percentage of the average demand or the area under the curve for each class of service. The percentages may be based on the percentage of the aggregate mean or the aggregate areas under the demand curves. In yet another embodiment, the CoS capacity attributed determination module 210 determines a peak capacity allocated to a class of service, determines whether the peak capacity occurs outside of a peak capacity of all the classes of service, and attributes less than the portion of the required capacity for the class of service to the class of service. For example, the amount attributed may be reduced by a predetermined amount or by a variable amount, which may be relative to allocated capacity.

After the CoS capacity attributed determination module 210 determines the portions of the required capacity attributed to each CoS, the application capacity attributed determination module 211 determines a portion of the required capacity attributed to each application in each CoS. In one embodiment, the application capacity attributed determination module 211 determines an amount of unused capacity attributed to each application in a CoS and determines the portion of the required capacity attributed to each application for a CoS based at least in part on an amount of unused capacity attributed to each application in the CoS. The amount of unused capacity attributed to each application may be determined from a difference between a peak demand and the time varying demand for each application.

For example, referring to FIG. 3, the trace data for the traces 301 and 302 may be continuously captured or periodically captured by the resource monitor 124 shown in FIG. 1, and a demand may be calculated for each time slot for the period of time the trace data is captured. For example, the trace data for the traces 301 and 302 may be captured over a week, and the week is divided into 5 minute time slots. Several measurements may be taken by the resource monitor 124 during each time slot, and a demand for each time slot may be a representation of the values measured for each time slot. In one example, the demand for each time slot is the mean of the measurements taken during each time slot. In another example, the demand for each time slot is the sum of the measurements taken during each time slot.

Using the peak demand over all the slots and the mean demand per slot, the application capacity attributed determination module 211 may determine an amount of unused capacity attributed to each application in each CoS. For example, for each slot s and for each CoS c the unused capacity $U_{c,t}$ may be calculated as follows:

$$U_{c,t}=C_c-D_{c,t} \quad \text{Equation (6)}$$

Figure 4:
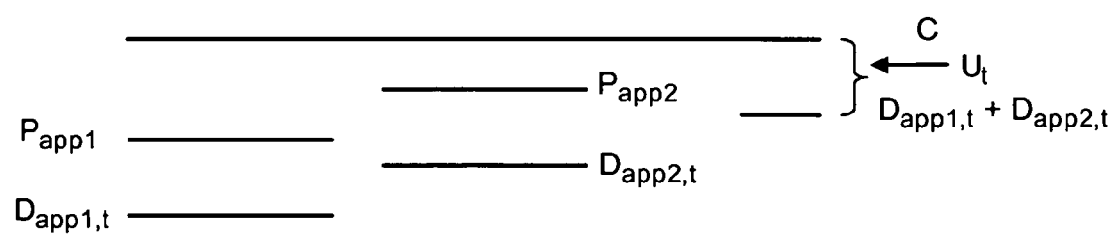
FIG. 4 illustrates values for a slot for a trace, according to an embodiment.

$C_c$ is the required capacity for a CoS, and $D_{c,t}$ is the mean demand for all the applications for the slot s. FIG. 4 illustrates an example of a slot s having demands for applications in a single CoS c such as the $CoS_0$ shown in FIG. 3. For simplicity, the class of service index c is not shown in the FIG. 4. In the example shown in FIG. 4, two applications 1 and 2 are shown as having demands in the slot. The peaks of the applications are shown as $P_{app1}$ and $P_{app2}$, which is the peak demand for each application across all the slots. Also shown is the demand for each of the applications, $D_{app1}$ and $D_{app2}$, for the slot, t, which are labeled $D_{app1,t}$ and $D_{app2,t}$. Demands for each of multiple slots, t, and for each application are determined. As described above, $D_{app1,t}$ and $D_{app2,t}$ may include the mean of all values measured for the application in the slot, and $D_{app1,t}$ and $D_{app2,t}$ may be referred to as the mean demand. Also shown in FIG. 4 is the unused capacity $U_t$ for the slot. It should be noted that the sum of the demands for the slot ($D_{app1}+D_{app2}$) and the unused capacity $U_t$ is equal to the required capacity, based on equation 6.

For applications having demand in slot s the application capacity attributed determination module 211 determines a fraction of the $U_{c,t}$ attributed to each application. In one example, the fraction of the attributed to each application may be based on the difference between the application's peak demand over all the slots and the application's actual demand for the slot s for the CoS c. Thus, an application having a demand close to its peak capacity in the slot is attributed less of the unused capacity $U_{c,t}$ for the slot. In the example shown in FIG. 4, applications 1 and 2 are attributed approximately the same amount of the unused capacity $U_{c,t}$.

The difference for each slot and for each CoS is referred to as $D_{i,c,t}$, where i is the application i of multiple applications having demands in the slot s. The application capacity attributed determination module 211 computes the sum of these differences, $D_{i,c,t}$ for each slot as follows:

$$\text{SumDiff}_{c,t}=\text{sum over all applications } (Pi,c-D_{i,c,t}) \quad \text{Equation (7)}$$

The application capacity attributed determination module 211 uses the sum of the differences to compute a fraction of the unused capacity for each application i. The fraction of the unused capacity for each application is represented as $F_{i,c,t}$ and is computed as follows:

$$F_{i,c,t}=(P_{i,c,t}-D_{i,c,t})/\text{SumDiff}_{c,t} \quad \text{Equation (8)}$$

The application capacity attributed determination module 211 uses the fraction of the unused capacity for each application, represented as $F_{i,c,t}$, to compute each application's share of the required capacity for the CoS c and for the slot t as follows:

$$S_{i,c,t}=D_{i,c,t}+(F_{i,c,t}*U_{c,t}) \quad \text{Equation (9)}$$

The application capacity attributed determination module 211 computes an application's share of the required capacity as the sum of the $S_{i,c,t}$ over all the slots divided by the number of slots.

The equations (6)-(9) provide one embodiment for determining the portion of the required capacity attributed to each application. In this embodiment, generally a portion of the unused capacity is attributed to an application based on the difference between the applications peak demand and the actual demand for each slot, which may include a mean per slot. It will be apparent to one of ordinary skill in the art that other procedures may be used to determine the portion of required capacity attributed to each application.

In certain situations, the demand $D_0$ may be greater than the required capacity $C_c$. For example, the required capacity of a workload is the capacity that is needed for running the workload such that the resource access probability θ and the deadline s specified for the CoS for the workload are met. If θ is less than 1, then some of the demand may be carried forward into a future time slot. If this is the case, then the portion of the required capacity for an application in the time slot may be reduced by an amount based on the capacity carried forward. In one embodiment, carried forward demands are not included in an application's mean demand. In another embodiment, the demand may be reduced by an amount relative to the capacity carried forward. For example, the demand $D_{i,c,t}$ may be reduced based on a ratio $C_c/D_{c,t}$ to determine a modified demand $D'_{i,c,t}$ for each application in the slot as follows:

$$D'_{i,c,t}=D_{i,c,t}*(C_c/D_c) \quad \text{Equation (10)}$$

Figure 5:
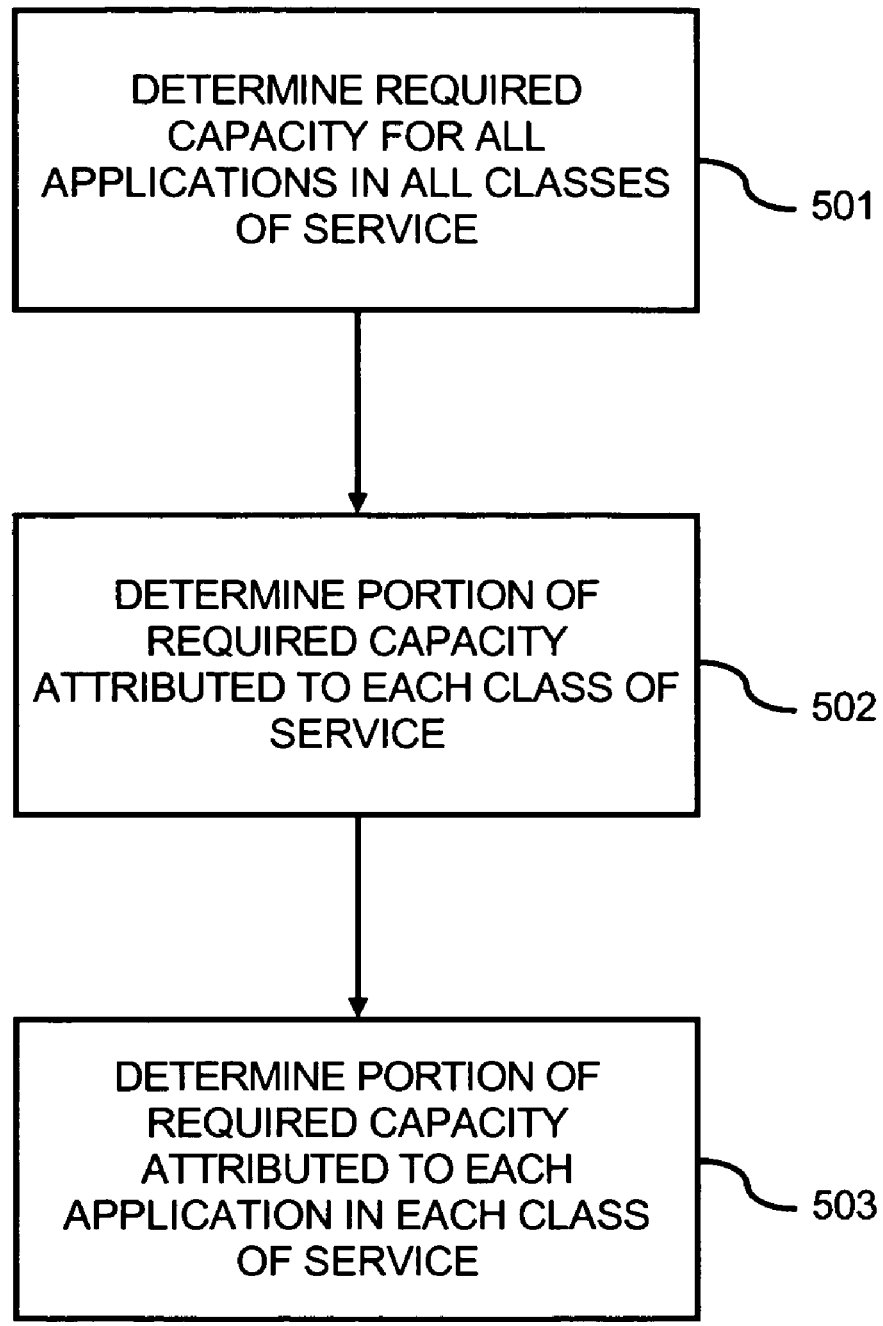
FIG. 5 illustrates a flow chart of a method for determining a portion of a required capacity attributed to applications, according to an embodiment.

FIG. 5 illustrates a flow chart of a method 500 for determining a portion of a required capacity attributed to applications, according to an embodiment. The method 500 is described with respect to FIGS. 1-4 by way of example and not limitation and the method 500 may be implemented in systems other than described herein.

At step 501, the capacity manager 130 determines the required capacity for the applications 111 running on the pool of resources 110 shown in FIG. 1. In one embodiment, the required capacity may be determined prior to allocating the resources to the applications 111 using the simulator 132 and the optimizer 134. The applications 111 may include applications in multiple CoSs, and the required capacity may be the capacity needed to run all the applications 111 while satisfying any class of service constraints for the applications 111. A required capacity may be determined for each of multiple attributes, also referred to as capacity attributes.

At step 502, the capacity attributed determination engine 201 shown in FIG. 2 determines a portion of the required capacity attributed to each class of service based on traces for the applications 111 running on the shared pool of resources 110. For example, after running the applications 111, traces for the applications 111 are used to determine the portion of the required capacity attributed to each class of service.

At step 503, the capacity attributed determination engine 201 determines a portion of the required capacity attributed to each application in each class of service from the portion of the required capacity attributed to each class of service.

Figure 6:
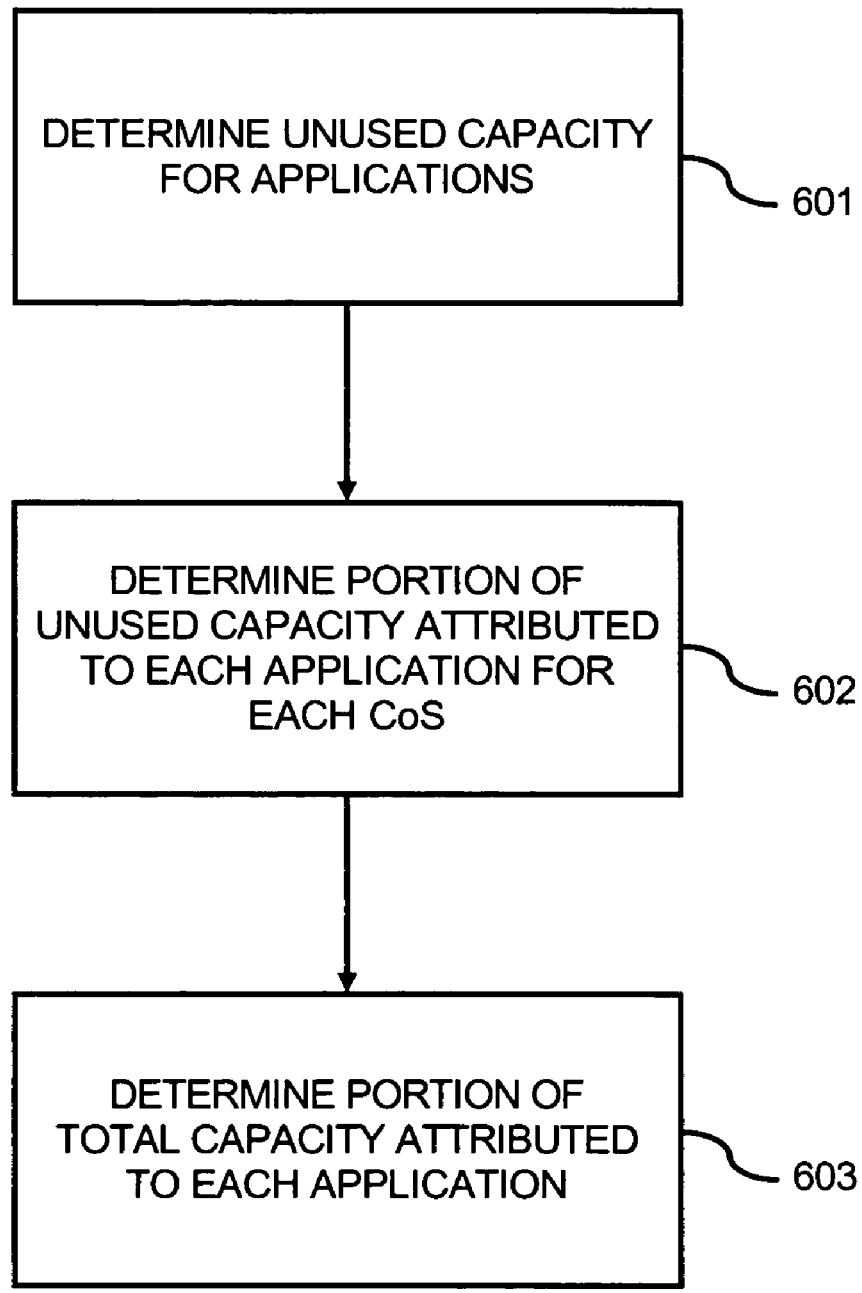
FIG. 6 illustrates a flow chart of a method for determining the capacity attributed to each application, according to an embodiment.

FIG. 6 illustrates a method 600 for determining the capacity attributed to each application, according to an embodiment. The method 600 is described with respect to FIGS. 1-4 by way of example and not limitation and the method 600 may be implemented in systems other than described herein.

At step 601, the capacity attributed determination engine 201 determines an amount of unused capacity for the pool of resources 110 in a shared utility running the applications 111 in multiple classes of service based on traces for the applications 111. For example, the total capacity of the pool of resources 110 is determined. This may include the maximum capacity for each of the resources. The required capacity for all the applications 111 is determined. The unused capacity equals the total capacity minus the required capacity.

At step 602, the capacity attributed determination engine 201 determines a portion of the unused capacity attributed to each application in each class of service. Equations (6)-(8) may be used to determine a portion of the unused capacity attributed to each application in each class of service. For example, the application capacity attributed determination module 211 uses the sum of the differences to compute a fraction of the unused capacity for each application i. The fraction of the unused capacity for each application is represented as and is computed as follows:

$$F_{i,c,t} = (P_{i,c,t} - D_{i,c,t})/SumDiff_{c,t} \quad \text{Equation (8)}$$

The fraction of unused capacity for each slot may be summed to determine the portion of the unused capacity attributed to each application.

At step 603, the capacity attributed determination engine 201 determines a portion of the total capacity of the resources attributed to each application based on capacity used by each application and the portion of the unused capacity attributed to each application. The capacity used by each of the applications 111 may be determined from the traces 125. The capacity used by an application may be added to the portion of the unused capacity attributed to the application to determine the portion of the total capacity of the resources attributed to the application.

In one embodiment, the portion of the total capacity of the resources attributed to each application is determined by computing the total demand of each application per slot and the total demand of all applications per slot. The unused capacity attributed to each application is based on the fraction of total per-application demand per slot over the total application demand per slot. The portion of the total capacity of the resources attributed to an application is its share of this unused capacity and the shared portion of the required capacity as determined by equations (6)-(8).

A consolidation algorithm or another technique may be used to allocate resources to applications. The capacity attributed determination engine 201 shown in FIG. 2 is operable to determine the unused capacity attributed to each application, which may be included in the capacity attributed to each application. Applications may be assigned to servers based on the consolidation algorithm. Certain servers may have resources that are utilized more and have a smaller amount of unused capacity than other servers based on how the applications are assigned to the resources. If the capacity attributed determination engine 201 determines unused capacity attributed to each application on a per server basis, then certain applications may be attributed more unused capacity based on how the applications are assigned to the servers, which may be unfair.

Figure 7:
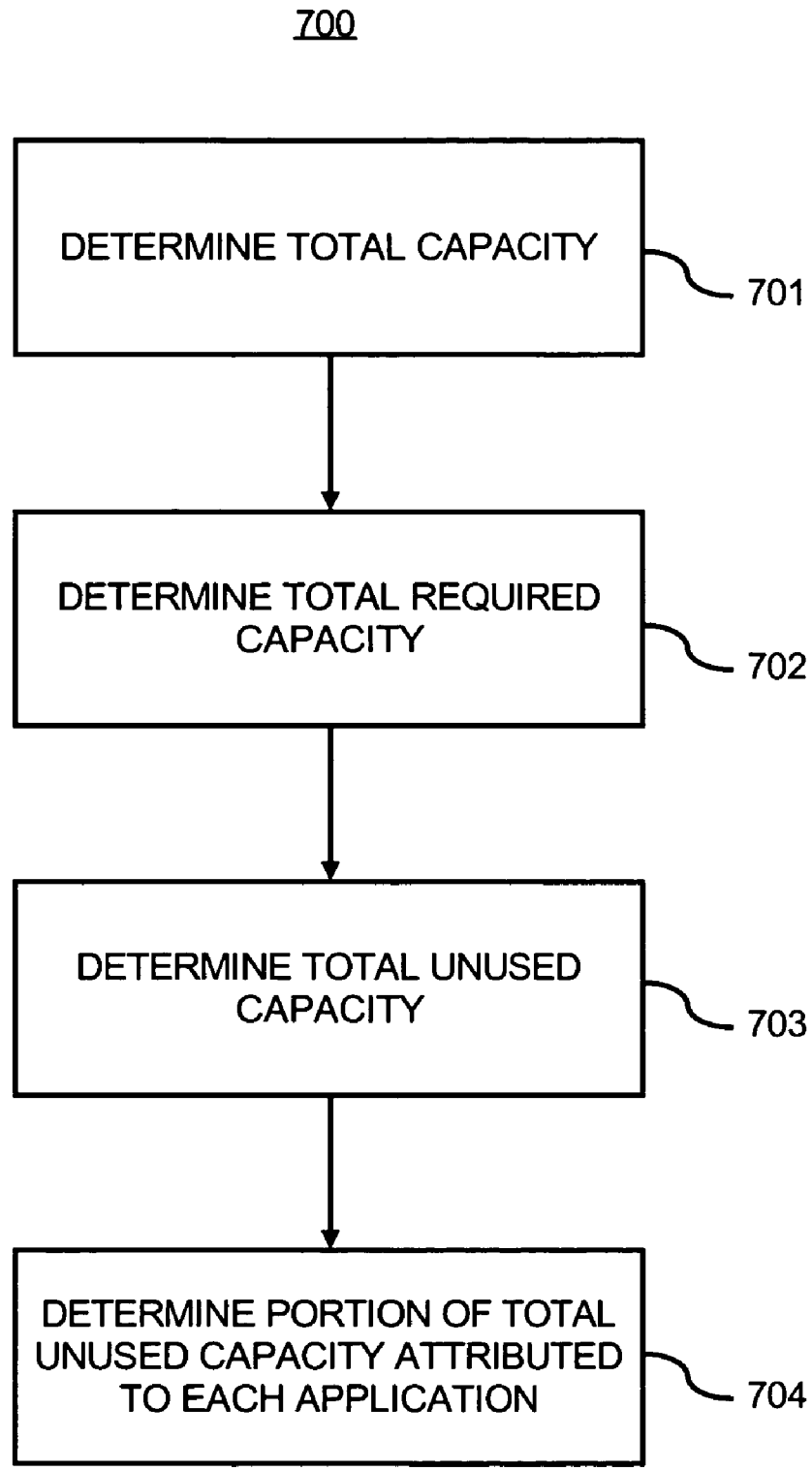
FIG. 7 illustrates a flow chart of a method for determining the capacity attributed to each application, according to another embodiment.

According to an embodiment, to overcome this unfairness, the capacity for each server is aggregated to form a virtual resource. Then, this capacity is apportioned among all the applications in a CoS running on the virtual resource. FIG. 7 illustrates a method 700 for determining the capacity attributed to each application, according to another embodiment. The method 700 is described with respect to FIGS. 1-4 by way of example and not limitation and the method 700 may be implemented in systems other than described herein.

At step 701, the capacity attributed determination engine 201 determines the total capacity of a virtual resource. The virtual resource, for example, includes all the resources in the pool of resources 110 running the applications 111 shown in FIG. 1. The capacity of the virtual resource is the total capacity of the pool of resources 110 running the applications 111 in this example. The virtual resource is a representation of multiple resources running application and in other examples may include a subset of all the resources running the applications 111.

At step 702, the capacity attributed determination engine 201 determines the required capacity of the virtual resource. This may include determining the total required capacity of the resources running the applications 111, the total required capacity per CoS, and/or the total required capacity per application in each CoS.

At step 703, the capacity attributed determination engine 201 determines the difference between the total capacity, which is the capacity of the virtual resource, and the total required capacity, which is the required capacity of the virtual resource. The difference between the total capacity and the total required capacity is the total unused capacity.

At step 704, the capacity attributed determination engine 201 determines a portion of the total unused capacity attributed to each application. The total unused capacity may be divided based on weighted demand. For example, the greater the portion of the total capacity needed to run a customer's applications, the greater the portion of the total unused capacity is attributed to the customer's applications. In another example, the portion of the total unused capacity is determined based on a difference between peak over all slots and per slot means, such as described above with respect to Equations (6)-(8).

Figure 8:
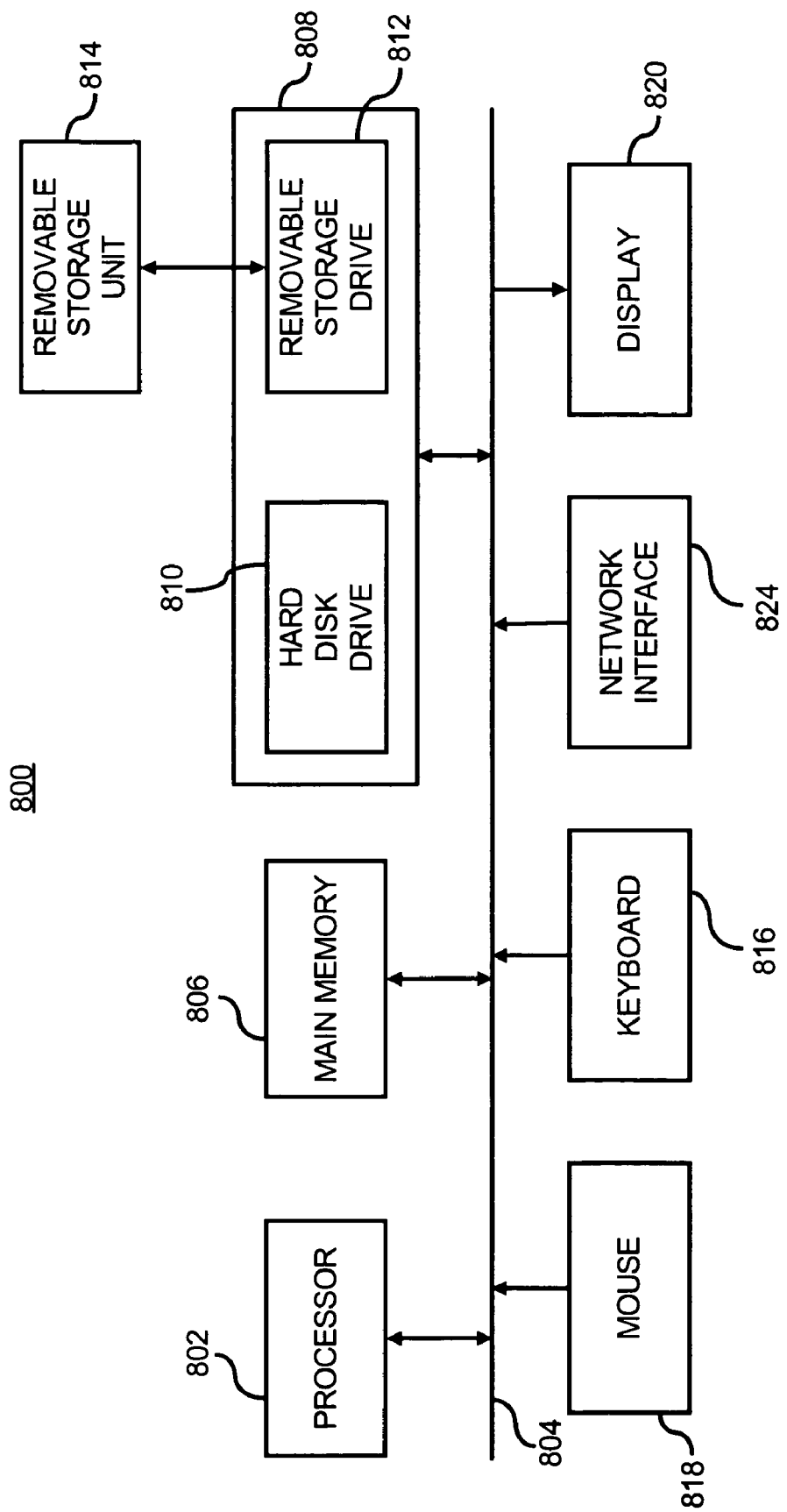
FIG. 8 illustrates a computer system, according to an embodiment.

FIG. 8 illustrates a schematic diagram of a computer system 800 which may be used as a hardware platform for the components of the system 100, such as the capacity manager 130 and/or the resource manager 120 shown in FIG. 1 or for the capacity attributed determination engine 201 shown in FIG. 2.

The computer system 800 may include one or more processors, such as processor 802, providing an execution platform for executing software. The computer system 800 also includes a memory 806, which may include Random Access Memory (RAM) where software is resident during runtime. Other types of memory such as ROM (read only memory), EPROM (erasable, programmable ROM), EEPROM (electrically erasable, programmable ROM) and data storage, such as hard disks, etc., may be used. For example, storage 808 may include one or more hard disk drives 810, a removable storage drive 812, and a removable storage unit 814 used with the drive 812.

A user interfaces with the computer system 800 with one or more input devices such as a keyboard 816 and a mouse 818. A display 820 and a network interface 824 may also be included. It will be apparent to one of ordinary skill in the art that FIG. 8 is meant to illustrate a generic computer system. Any type of computer system may be used. Furthermore, one or more components of the components of the computer system 800 are optional, such as the display and input devices, and other types of components may be used or substituted as is known in the art.

One or more of the steps of the methods 500-700 and other steps described herein may be implemented as software embedded or stored on a computer readable medium, such as the memory 806, where the software is resident during runtime, and executed by the processor 802. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

While the embodiments have been described with reference to examples, those skilled in the art will be able to make various modifications to the described embodiments. In particular, although the methods have been described by examples, steps of the methods may be performed in different orders than illustrated or simultaneously. Those skilled in the art will recognize that these and other variations are possible.

What is claimed is:

1. A method comprising:
   determining, using a processor, a required capacity for applications, wherein the applications are run on a shared pool of resources and each application belongs to at least one class of service of multiple classes of service;
   determining a portion of the required capacity attributed to each class of service based on traces for the applications running on the shared pool of resources; and
   determining a portion of the required capacity attributed to each application in each class of service from the portion of the required capacity attributed to each class of service.

2. The method of claim 1, wherein determining a portion of the required capacity attributed to each class of service further comprises:
   determining a peak capacity allocated to each class of service; and
   determining a percentage of the required capacity attributed to each class of service based on the determined peak capacity for the class of service.

3. The method of claim 2, wherein determining a percentage of the required capacity attributed to each class of service further comprises:
   determining a peak capacity allocated to each class of service divided by a sum of the peak capacities for all the classes of service; and
   multiplying the required capacity for the applications with the peak capacity allocated to each class of service divided by a sum of the peak capacities for all the classes of service.

4. The method of claim 2, wherein determining a portion of the required capacity attributed to each class of service further comprises:
   determining an average demand for each class of service; and
   determining the portion of the required capacity based on the average demand for each class of service.

5. The method of claim 2, wherein determining a portion of the required capacity attributed to each class of service further comprises:
   determining an area under a demand curve for each class of service; and
   determining the portion of the required capacity based on the area under a demand curve for each class of service.

6. The method of claim 1, wherein determining a portion of the required capacity attributed to each class of service further comprises:
   determining a peak capacity allocated to a class of service;
   determining whether the peak capacity occurs outside of a peak capacity region of all the classes of service; and, if so, attributing less than the portion of the required capacity for the class of service to the class of service.

7. The method of claim 1, wherein determining a portion of the required capacity attributed to each application in each class of service further comprises:
   determining an amount of unused capacity attributed to each application in a class of service; and
   determining the portion of the required capacity attributed to each application for a class of service based at least on an amount of unused capacity attributed to each application in the class of service.

8. The method of claim 7, wherein determining an amount of unused capacity attributed to each application in a class of service further comprises:
   determining the amount of unused capacity attributed to each application based on a difference between a peak demand and a demand for each application.

9. The method of claim 8, wherein the amount of unused capacity is relative to the difference between a peak capacity of the application and the demand of the application determined over a plurality of time slots.

10. The method of claim 9, further comprising:
    reducing the amount of unused capacity attributed to each application in a time slot of the plurality of time slots in response to demand for all applications in the time slot exceeding the required capacity for all applications in the time slot.

11. The method of claim 9, wherein the reduced amount is relative to a ratio of the required capacity over the demand for the time slot.

12. The method of claim 1, wherein the required capacity is the capacity needed to run all the applications in the multiple classes of service while satisfying any class of service constraints for each class of service.

13. The method of claim 12, wherein a class of service constraint comprises a probability that an application in the class of service receives a unit of capacity when requested, and a deadline for receiving the unit of capacity if the unit of capacity is not allocated to the application when requested.

14. A method comprising:
   determining, using a processor, an amount of unused capacity for resources in a shared utility running applications in multiple classes of service based on traces for the applications;
   determining a portion of the unused capacity attributed to each application in each class of service; and
   determining a portion of a total capacity of the resources attributed to each application based on capacity used by each application and the portion of the unused capacity attributed to each application.

15. The method of claim 14, wherein determining a portion of the unused capacity attributed to each application in each class of service further comprises:
   determining a peak capacity allocated to each class of service;
   determining a required capacity for each class of service, wherein the required capacity is a percentage of an aggregate required capacity attributed to the multiple classes of service, the percentage being based on the determined peak capacity for the class of service; and
   determining a portion of the unused capacity attributed to each application using the required capacity for the class of service for the application.

16. The method of claim 14, wherein determining a portion of the unused capacity attributed to each application comprises:
   determining unused capacity for each slot of a plurality of slots for which demand for applications in a class of service is measured; and
   determining a portion of the unused capacity attributed to each application for each slot based on a difference between a peak demand of each application over all the slots and a demand for each application in each slot.

17. The method of claim 14, wherein determining a portion of the unused capacity attributed to each application comprises:
   for a plurality of time slots, computing a fraction of a total per-application demand per time slot over the total application demand per slot for each application; and
   determining the portion of the unused capacity attributed to each application based on the fraction computed for each application.

18. A method comprising:
   determining, using a processor, a total capacity of resources used to run applications in a shared utility;
   determining a total required capacity of the applications;
   determining a total unused capacity based on a difference between the total capacity and the total required capacity; and
   determining a portion of the total unused capacity attributed to each of the applications based on the demand of each application.

19. The method of claim 18, wherein determining a portion of the total unused capacity further comprises:
   determining the portion of the total unused capacity attributed to each application based on differences between a peak demand of the application over a plurality of time slots and a mean demand for each of the plurality of time slots.

20. The method of claim 18, wherein determining a portion of the total unused capacity further comprises:
   determining the portion of the total unused capacity attributed to each application based on amount of the total capacity used by each application.

* * * * *

UNITED STATES PATENT AND TRADEMARK OFFICE
CERTIFICATE OF CORRECTION

PATENT NO.       : 7,925,757 B1                                        Page 1 of 1
APPLICATION NO.  : 11/492739
DATED            : April 12, 2011
INVENTOR(S)      : Jerry Rolia et al.

It is certified that error appears in the above-identified patent and that said Letters Patent is hereby corrected as shown below:

In column 5, line 58, after "deadline" insert -- s --.

In column 6, line 31, delete "$PP_1=P_0+P_1$" and insert -- $PP_1=P_1/(P_0+P_1)$ --, therefor.

In column 7, line 57, after "the" insert -- $U_{c,t}$ --.

Signed and Sealed this
Thirteenth Day of September, 2011

David J. Kappos
*Director of the United States Patent and Trademark Office*